US009566692B2

(12) United States Patent
Seith et al.

(10) Patent No.: US 9,566,692 B2
(45) Date of Patent: Feb. 14, 2017

(54) ROTARY IMPACT DEVICE

(75) Inventors: Warren Andrew Seith, Bethlehem, PA (US); Ryan Scott Amend, Bethlehem, PA (US)

(73) Assignee: Ingersoll-Rand Company, Montvale, NJ (US)

( * ) Notice: Subject to any disclaimer, the term of this patent is extended or adjusted under 35 U.S.C. 154(b) by 1442 days.

(21) Appl. No.: 13/080,030

(22) Filed: Apr. 5, 2011

(65) Prior Publication Data

US 2012/0255749 A1 Oct. 11, 2012

(51) Int. Cl.
*B23Q 5/00* (2006.01)
*B25B 13/06* (2006.01)
*B25B 21/02* (2006.01)

(52) U.S. Cl.
CPC ............... *B25B 13/06* (2013.01); *B25B 21/02* (2013.01); *B25B 21/026* (2013.01)

(58) Field of Classification Search
CPC .... B25B 21/02; B25B 23/0035; B25B 13/065; B25B 19/00; B25B 21/023; B25B 23/14; B25B 31/00; B25B 13/06; B25B 15/001; B25B 23/1453; B25D 17/005; B25D 17/00; B25D 17/088
USPC ......... 173/1, 2, 176, 179, 183, 217; 81/12.1, 81/124.6
See application file for complete search history.

(56) References Cited

U.S. PATENT DOCUMENTS 881,856 A * 3/1908 Hagstrom ............. B23B 51/044 408/212
1,222,996 A * 4/1917 Rhodes .................. A63H 27/14 446/42
1,592,183 A * 7/1926 De Golyer ...................... 152/55
2,301,860 A 11/1942 Doane
2,608,444 A * 8/1952 Ronfeldt .................. 301/64.102
2,969,660 A 1/1961 Dale et al.
3,583,821 A * 6/1971 Shaub ................ B23Q 11/0053 144/252.1
3,710,873 A 1/1973 Allen et al.
3,741,313 A 6/1973 States et al.
3,823,624 A * 7/1974 Martin .................. B25B 13/461 81/177.2

(Continued)

FOREIGN PATENT DOCUMENTS

CN 1765589 5/2006
DE 940877 3/1956

(Continued)

OTHER PUBLICATIONS

International Searching Authority, International Search Report and Written Opinion from PCT/US2012/032116, Jun. 20, 2012, 10 pages.

(Continued)

*Primary Examiner* — Robert Long
(74) *Attorney, Agent, or Firm* — Barnes & Thornburg LLP

(57) ABSTRACT

The present invention provides methods and systems for a rotary impact device having an annular exterior surface for use with an impact wrench for providing torque to a fastener. The rotary impact device includes an input member having an input recess for receiving the anvil of the impact wrench, an output member having an output recess for receiving the fastener, and an inertia member. The inertia member is stationary and positioned on the exterior surface of the rotary impact device for increasing the torque applied to the fastener.

4 Claims, 7 Drawing Sheets

(56) References Cited

U.S. PATENT DOCUMENTS 3,859,821 A * 1/1975 Wallace .................... F16D 3/76 464/89
3,881,215 A * 5/1975 Krier ..................... E01H 1/0854 15/230.16
3,881,838 A * 5/1975 Derbyshire ........... B23B 31/001 408/241 G
4,068,377 A * 1/1978 Kimmel ............... A01D 34/416 30/276
4,075,927 A * 2/1978 Frazier .................. B23B 31/261 279/142
4,098,354 A * 7/1978 Alcenius ................. B25B 21/02 173/93.5
4,157,120 A * 6/1979 Anderson ....................... 173/93
4,169,366 A * 10/1979 Ames ...................... B21C 25/04 72/261
4,213,621 A * 7/1980 Fink ........................ B23B 31/14 279/110
4,341,001 A * 7/1982 Swartout ................. B23P 15/00 29/463
4,541,160 A * 9/1985 Roberts ........................ 29/401.1
4,561,507 A * 12/1985 Liou ............................ 173/93.7
4,671,141 A * 6/1987 Hanson .......................... 81/53.2
4,708,209 A * 11/1987 Aspinwall ....................... 173/93
4,792,065 A * 12/1988 Soehnlein ......... B05C 17/00579 222/386
4,800,786 A * 1/1989 Arnold .................... B25B 13/06 81/121.1
4,836,059 A * 6/1989 Arnold .................... B25B 13/06 76/114
4,849,047 A * 7/1989 Ferguson ................ B23P 11/00 156/273.9
4,860,611 A * 8/1989 Flanagan ................ F16C 15/00 29/894
4,943,815 A * 7/1990 Aldrich .................... B41J 29/02 250/515.1
4,979,355 A * 12/1990 Ulevich .................. B25B 13/06 81/121.1
5,102,271 A * 4/1992 Hemmings ........... B23B 31/005 408/144
5,181,148 A * 1/1993 Blanchette ............... H02K 7/14 360/99.08
D338,146 S 8/1993 Gramera
5,310,341 A * 5/1994 Byer ........................ A61C 3/02 433/116
5,328,308 A 7/1994 Ducker, III et al.
5,366,082 A * 11/1994 Haytayan ................ F16B 15/08 206/343
5,375,637 A * 12/1994 Matsumoto .......... B23Q 1/0009 144/134.1
5,405,221 A * 4/1995 Ducker, III ........... B23B 31/005 279/83
5,432,644 A * 7/1995 Tajima ................... G11B 19/20 310/156.26
5,535,867 A 7/1996 Coccaro et al.
5,724,209 A * 3/1998 Dunckley ............ G11B 25/043 360/98.08
5,772,367 A * 6/1998 Daniel ............... B23Q 11/0046 173/75
5,794,325 A * 8/1998 Fallandy .............. B25D 11/108 173/203
5,842,651 A * 12/1998 Smothers ................ B02C 18/08 241/100
5,845,718 A 12/1998 Cooper et al.
5,848,655 A 12/1998 Cooper et al.
5,862,658 A * 1/1999 Howard ................. A01D 34/84 172/111
5,881,940 A * 3/1999 Almeras ................... B25C 1/14 227/10
5,906,149 A * 5/1999 Montenegro Criado B26D 7/20 83/346
5,957,012 A * 9/1999 McCune ................. B25B 13/56 81/180.1
5,992,538 A * 11/1999 Marcengill et al. ............ 173/93
6,045,141 A * 4/2000 Miles .................. B23B 31/1238 279/60
D425,385 S * 5/2000 Jarvis ............................... D8/29
6,098,726 A * 8/2000 Taylor et al. ................. 175/320
6,120,220 A * 9/2000 Speare .................... B23B 51/05 408/1 R
6,196,332 B1 3/2001 Albert et al.
6,202,968 B1 * 3/2001 Lehr .......................... 248/278.1
6,328,505 B1 * 12/2001 Gibble ................. B25H 1/0092 408/16
6,347,668 B1 * 2/2002 McNeill .................. E21B 21/10 166/105
6,427,564 B1 * 8/2002 Nelson ................... B25G 1/005 81/177.1
6,463,824 B1 * 10/2002 Prell et al. ...................... 74/417
6,517,408 B1 * 2/2003 Rehkemper ............ A63H 29/20 446/440
6,863,134 B2 3/2005 Seith et al.
6,913,613 B2 * 7/2005 Schwarz ............ A61B 17/2909 604/22
6,923,348 B2 * 8/2005 Grach ................... G01F 11/026 222/262
7,127,969 B2 * 10/2006 Hsieh ...................... B25B 13/06 81/120
7,153,214 B2 * 12/2006 Delaney .................. B25B 13/06 464/159
7,159,491 B1 * 1/2007 Chaconas ............... B25B 13/06 81/124.3
7,243,923 B2 * 7/2007 Campbell ........... B23B 31/1238 279/133
D573,165 S * 7/2008 Grundvig ..................... D15/139
7,395,871 B2 * 7/2008 Carrier ...................... B25F 5/00 173/1
7,563,061 B2 * 7/2009 Gibbons ............. B23B 31/1207 279/133
7,625,209 B2 * 12/2009 Wade ....................... A61C 1/16 408/56
7,987,748 B2 * 8/2011 Chiu ....................... B25B 13/06 81/119
7,997,169 B1 * 8/2011 Hack ............................ 81/177.2
8,132,990 B2 * 3/2012 Bauman ................ B23B 31/008 279/137
8,388,276 B2 * 3/2013 Jaillon .................. B23B 35/005 408/1 R
8,564,148 B1 * 10/2013 Novak ................... H02K 7/183 290/44
8,840,344 B2 * 9/2014 Stenman ................. B23B 51/05 408/186
2002/0071235 A1 * 6/2002 Gorczyca et al. ............ 361/231
2002/0185288 A1 * 12/2002 Hanke .................... B25D 17/24 173/201
2003/0010511 A1 * 1/2003 Hecht .................. B25D 11/102 173/48
2003/0154703 A1 * 8/2003 Lawrence .......... A01D 34/6806 56/10.8
2003/0163924 A1 * 9/2003 Hempe .................. B23D 45/16 30/388
2004/0074344 A1 * 4/2004 Carroll .................... B25B 13/06 81/121.1
2004/0182587 A1 * 9/2004 May et al. ........................ 173/2
2004/0194772 A1 * 10/2004 Hamilton .................. F41A 9/77 124/45
2004/0240954 A1 * 12/2004 Chilcott .................. E21B 7/008 408/239 A
2005/0016333 A1 * 1/2005 Compton ................... 81/177.85
2005/0087336 A1 * 4/2005 Surjaatmadja ......... B01D 17/00 166/105.5
2005/0135890 A1 * 6/2005 Bauman .................... 408/239 R
2005/0140241 A1 * 6/2005 Petersen ................ H02K 16/04 310/44
2005/0218185 A1 * 10/2005 Kenney ..................... B25C 1/06 227/133
2006/0006976 A1 * 1/2006 Bruno ........................... 336/229
2006/0078438 A1 * 4/2006 Wood ...................... F04B 17/03 417/362

(56) References Cited

U.S. PATENT DOCUMENTS

2006/0108890 A1* 5/2006 Hauger .................... H02K 1/16 310/214
2006/0175773 A1* 8/2006 Tsai et al. ..................... 279/143
2006/0225540 A1* 10/2006 Tsai et al. .................. 81/177.85
2006/0250029 A1* 11/2006 Kelly et al. ..................... 310/12
2006/0257220 A1* 11/2006 Gertner ................. B23B 49/005 408/202
2007/0142188 A1* 6/2007 Lien ................................ 482/93
2007/0289760 A1 12/2007 Sterling et al.
2008/0099217 A1 5/2008 Seith et al.
2009/0014193 A1* 1/2009 Barezzani et al. .............. 173/93
2009/0084567 A1* 4/2009 Basham .................... B25C 7/00 173/29
2009/0101376 A1* 4/2009 Walker et al. .................. 173/47
2009/0301269 A1* 12/2009 Wedge .................... B25B 13/48 81/124.2
2009/0321098 A1* 12/2009 Hull ......................... B23Q 5/06 173/1
2010/0000749 A1* 1/2010 Andel ............................. 173/48
2010/0000750 A1* 1/2010 Andel ............................. 173/48
2010/0069205 A1* 3/2010 Lee .................... A63B 21/0051 482/63
2010/0123359 A1* 5/2010 Nishikawa .............. B25B 21/00 310/50
2011/0030984 A1* 2/2011 Chen ..................... B23B 45/008 173/47
2011/0036605 A1* 2/2011 Leong et al. ................... 173/47
2011/0056714 A1 3/2011 Elger et al.
2011/0109092 A1* 5/2011 Echemendia ........... F03D 1/065 290/55
2011/0186316 A1* 8/2011 Barhitte .................... B25F 5/00 173/29
2012/0040802 A1* 2/2012 Dibble ............... A63B 22/0015 482/54
2012/0152067 A1* 6/2012 Yoshimachi ........ B25B 23/0085 81/57.36
2012/0170246 A1* 7/2012 Huang ............... B23Q 17/2404 362/89
2012/0234572 A1* 9/2012 Kratzig et al. ................ 173/213
2012/0255403 A1* 10/2012 Ehlers ................. B25B 23/1415 81/467
2012/0279736 A1* 11/2012 Tanimoto ................ B25B 21/02 173/2
2013/0062088 A1* 3/2013 Mashiko ............... B25B 21/026 173/2
2013/0186663 A1* 7/2013 Zhou ....................... B25F 5/001 173/48
2013/0192432 A1* 8/2013 Barker ................... A01G 3/053 83/13
2013/0205571 A1* 8/2013 Fanourgiakis et al. ......... 29/505
2013/0264087 A1* 10/2013 Harada ................... B25B 21/00 173/213
2013/0273792 A1* 10/2013 Davis ..................... B63H 20/14 440/75
2013/0277065 A1* 10/2013 Hallundbæk ......... E21B 43/121 166/372
2014/0217737 A1* 8/2014 Egana Castillo ....... F03B 13/10 290/53
2014/0231116 A1* 8/2014 Pollock ................... B25B 21/00 173/183
2015/0217431 A1* 8/2015 Seith ....................... B25B 13/06 81/121.1
2015/0217433 A1* 8/2015 Seith ................... B25B 23/0035 81/124.6

FOREIGN PATENT DOCUMENTS

GB 930816 7/1963
GB 2443399 A 5/2008
WO 2011017066 A1 2/2011

OTHER PUBLICATIONS

Extended European Search Report, European Application No. 12767994.2, May 26, 2015, 5 pages.
Chinese Translation First Office Action Issued by State Intellectual Property Office and Search Report; Application No. 201280016835.5, Dec. 31, 2014, 10 pages.

* cited by examiner

ROTARY IMPACT DEVICE

FIELD OF THE INVENTION

The present invention relates generally to an improved rotary impact device, and more generally relates to an improved rotary impact device for use with an impact tool, such as an impact wrench, wherein the improved rotary impact device increases rotational inertia for expeditiously loosening or tightening a fastener.

BACKGROUND OF THE INVENTION

Impact tools, such as an impact wrench, are well known in the art. An impact wrench is one in which an output shaft or anvil is struck by a rotating mass or hammer. The output shaft is coupled to a fastener (e.g. bolt, screw, nut, etc.) to be tightened or loosened, and each strike of the hammer on the anvil applies torque to the fastener. Because of the nature of impact loading of an impact wrench compared to constant loading, such as a drill, an impact wrench can deliver higher torque to the fastener than a constant drive fastener driver.

Typically, a fastener engaging element, such as a socket, is engaged to the anvil of the impact wrench for tightening or loosening the fastener. Most fasteners have a polygonal portion for engaging a socket. The socket typically has a polygonal recess for receiving the polygonal portion of the fastener, thus resulting in a selectively secured mechanical connection. This connection or engagement of the socket to the anvil results in a spring effect. Additionally, there is a spring effect between the socket and the fastener. Therefore, it is desirable to increase the amount of torque applied by the socket to overcome the spring effect and to increase the net effect and improve performance of the impact wrench.

BRIEF SUMMARY OF THE INVENTION

The present invention is related to a rotary impact device that has an annular exterior surface and includes an input member, an output member, and an inertia member. The inertia member is stationary and positioned on the exterior surface of the rotary impact device for increasing the torque of the rotary impact device. The rotary impact device is composed of steel. The rotary impact device includes an output member with an outer edge that is beveled for guiding the fastener into the output recess.

The rotary impact device may also include an input recess disposed on the input member, wherein the input recess is generally square shaped.

The rotary impact device may also include an output recess disposed on the output member, wherein the output recess is polygonal-shaped.

In an alternative embodiment of the present invention, the rotary impact device includes an inertia member that includes a ring and at least two ribs having a first end and a second end. The first end of the rib is positioned on the exterior surface of the rotary impact device and the second end is positioned on the ring.

In another alternative embodiment of the present invention, the rotary impact device includes an inertia member that includes at least two bores that extend substantially longitudinally along the length of the inertia member.

In yet another alternative embodiment of the present invention, the rotary impact device has an annular exterior surface for use with an impact wrench for providing torque to a fastener. The rotary impact device includes an input member that has an input recess for receiving an anvil of the impact wrench, an output member that has an output recess for receiving the fastener, and an inertia member. The inertia member is stationary and positioned on the exterior surface of the rotary impact device for increasing torque applied to the fastener.

In yet another alternative embodiment of the present invention, a method for providing additional torque to a fastener, includes providing an impact wrench having a rotary hammer that rotates an anvil, a rotary impact device having an annular exterior surface. The rotary impact device includes an input member, an output member, and an inertia member. The inertia member is stationary and positioned on the exterior surface of the rotary impact device for increasing the torque applied to the fastener. The input member is engaged to the anvil of the impact wrench in a selectively secured arrangement. The output member is engaged to a fastener in a selectively secured arrangement. Power is provided to the impact wrench and the impact wrench is activated, causing the rotary hammer and anvil to rotate. The input member and output member rotate in conjunction with the rotation of the anvil.

In yet another alternative embodiment of the present invention, a method for providing additional torque to a fastener that includes providing an anvil with a square head and an input member having an input recess, wherein the input recess is generally square for receiving the square head of an anvil.

In yet another alternative embodiment of the present invention, a method for providing additional torque to a fastener that includes providing an output member that has an output recess and the output recess is polygonal shaped for receiving the fastener.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Figure 1:
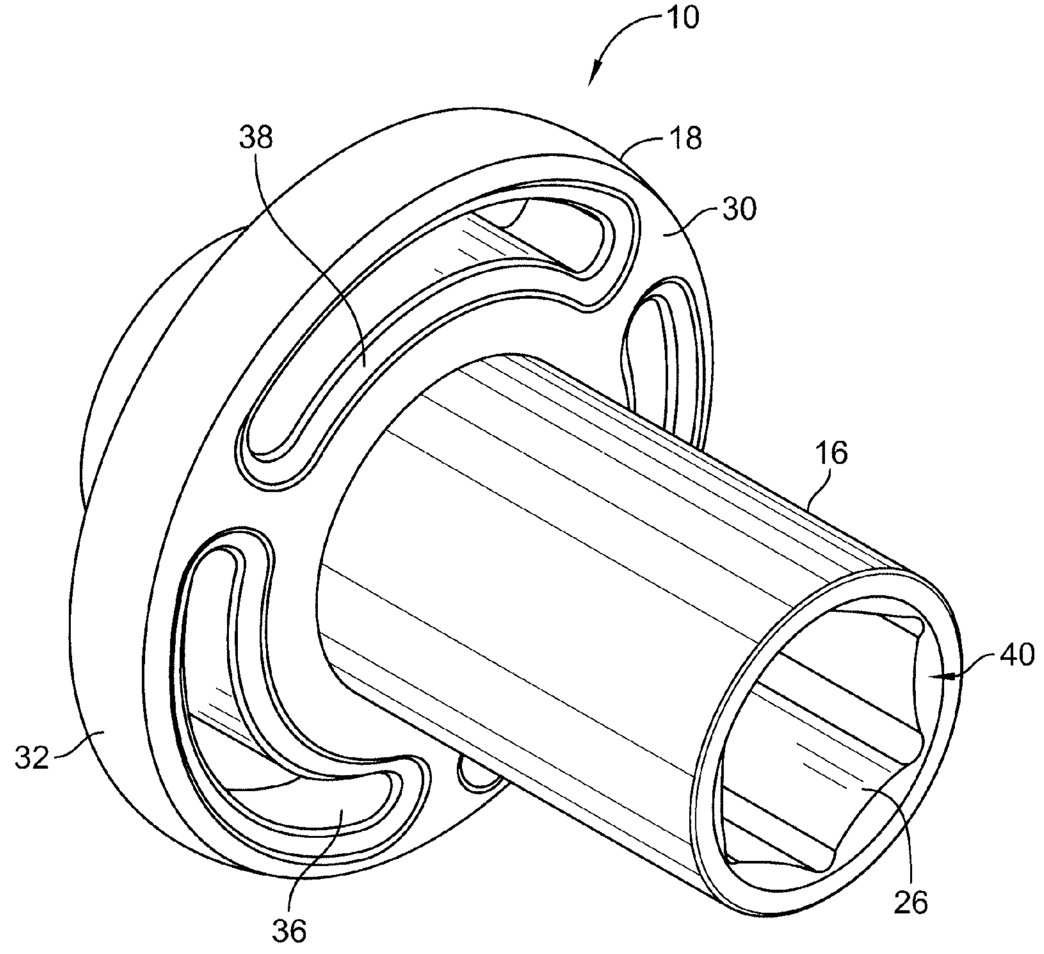
FIG. 1 is a perspective view of one embodiment of the rotary impact device.

Referring now specifically to the drawings, an improved rotary impact device is illustrated in FIG. 1 and is shown generally at reference numeral 10. The device 10 may be attached to and driven by an impact tool that is a source of high torque, such as an impact wrench 12. The device 10 is intended to be selectively secured to the impact wrench 12. The device 10 is preferably made of steel.

Figure 2:
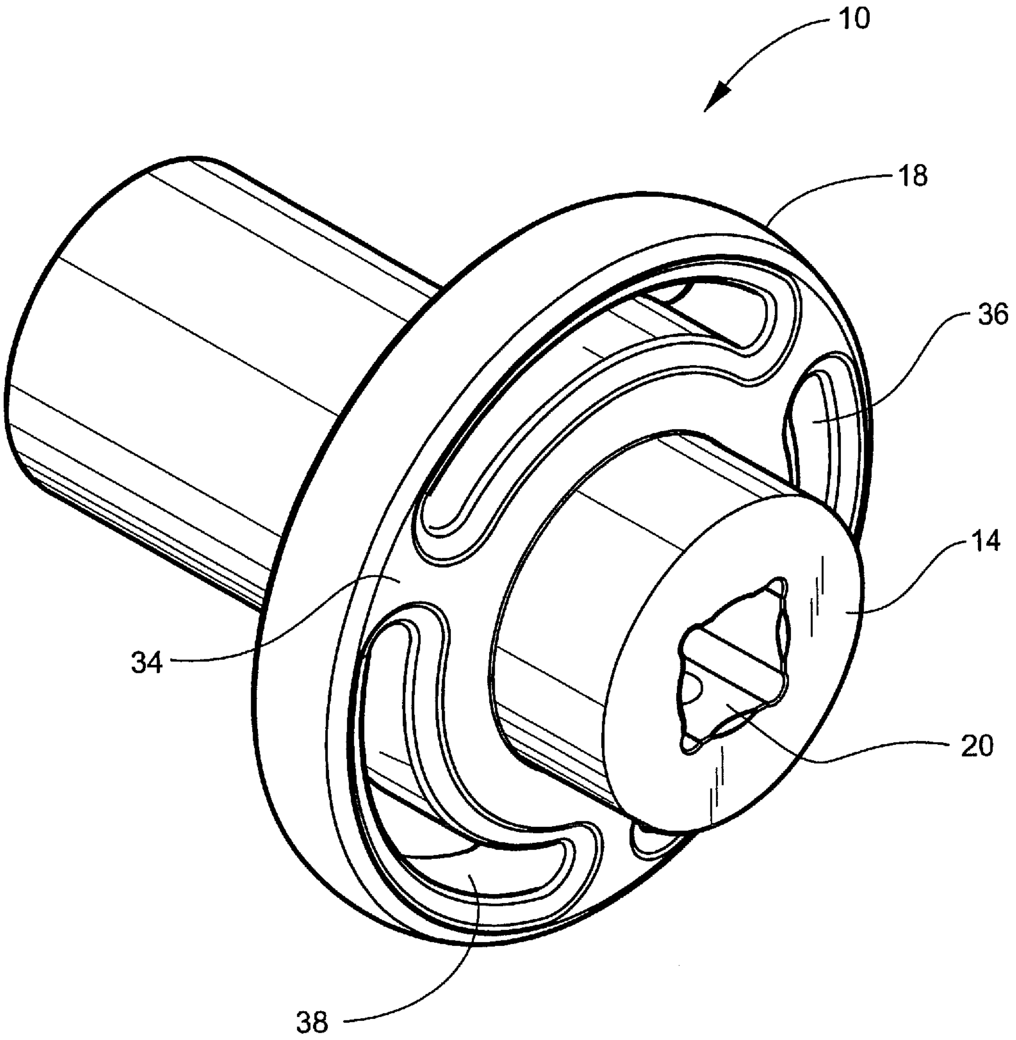
FIG. 2 is a another perspective view of the rotary impact device of FIG. 1.
Figure 3:
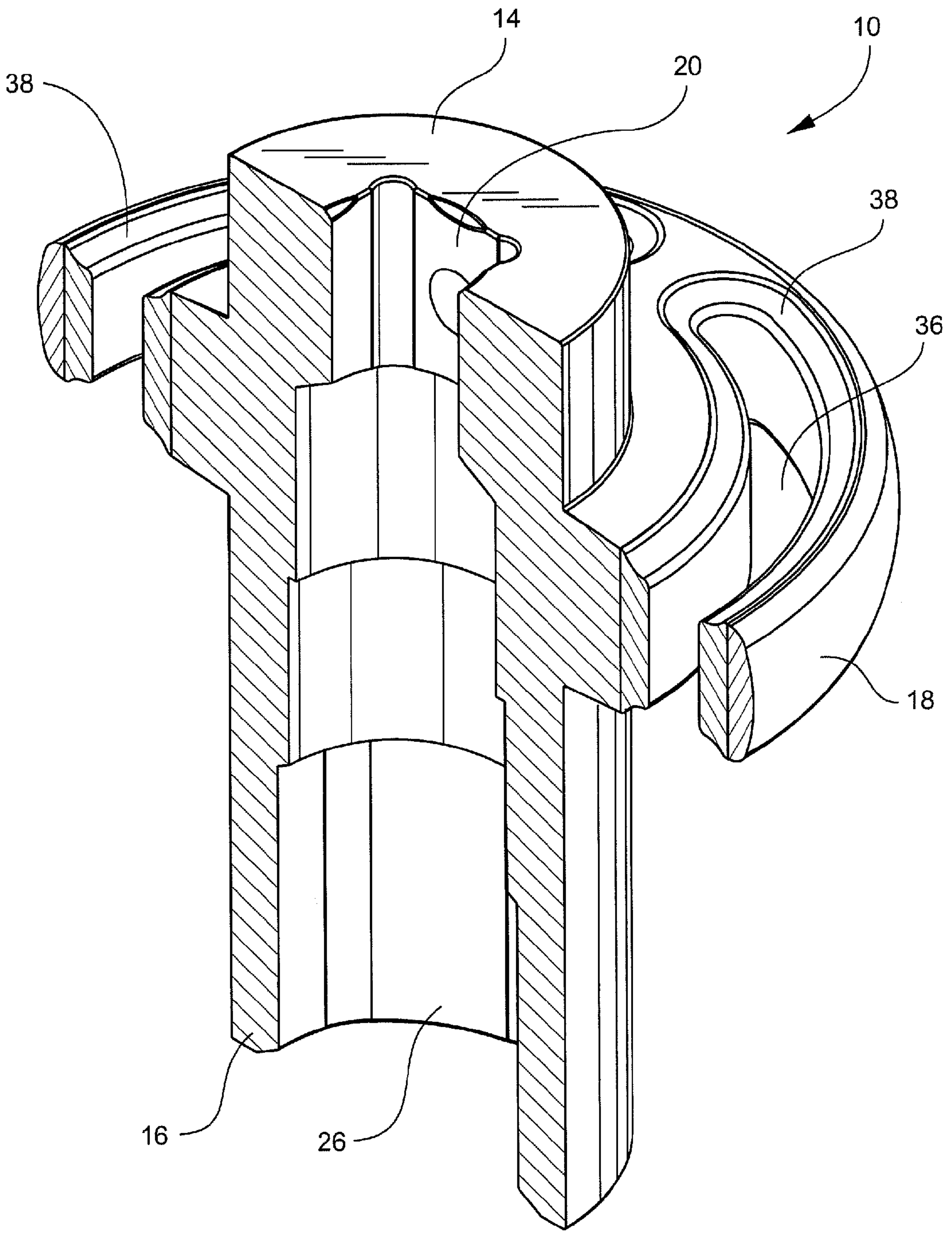
FIG. 3 is a cut-away view of the rotary impact device of FIGS. 1 and 2.
Figure 4:
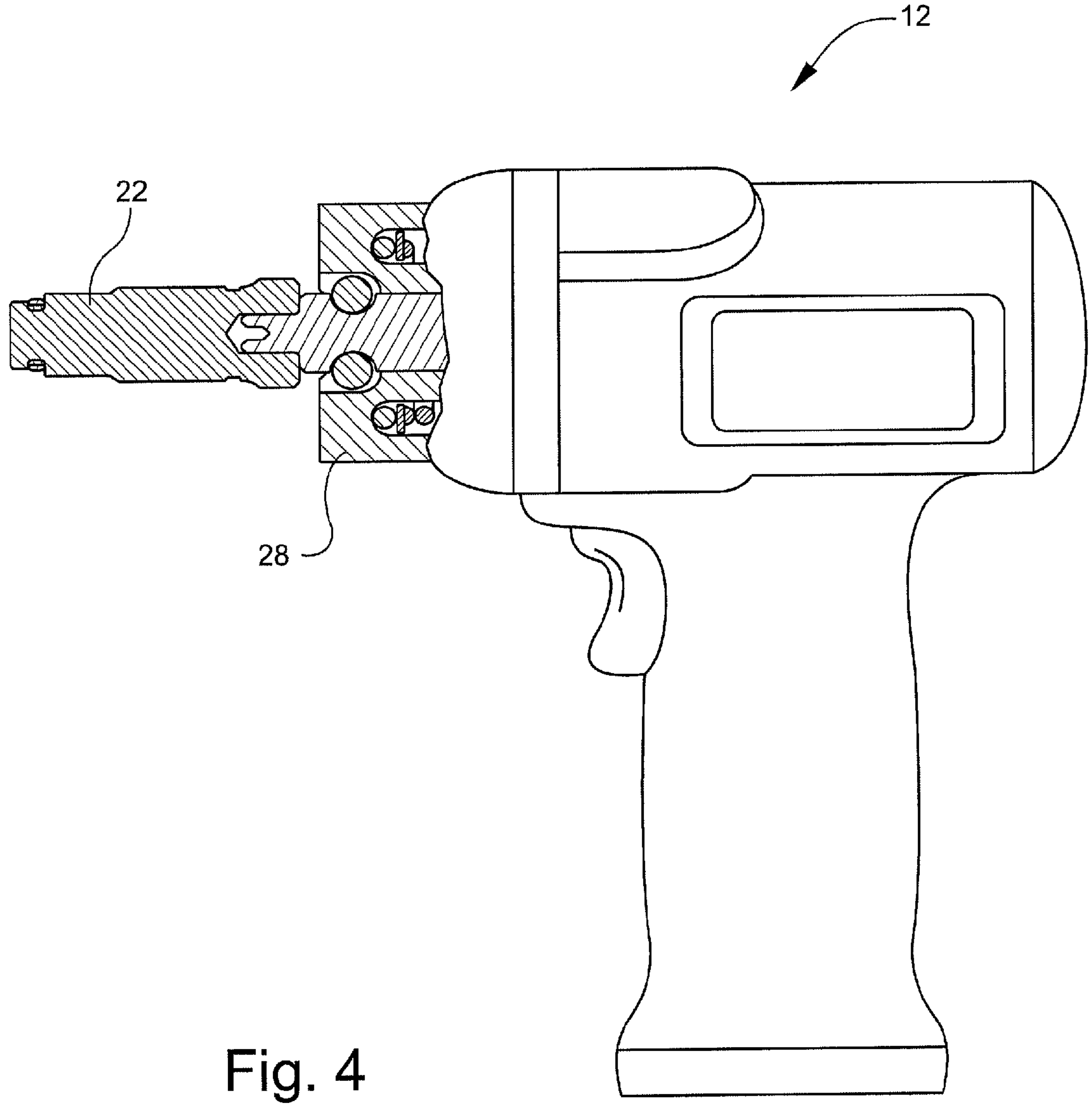
FIG. 4 is a partial cut-away side view of an impact wrench that may be used with the rotary impact device.

As illustrated in FIGS. 1, 2, and 3, the device 10 has an annular exterior surface and comprises an input member 14, an output member 16, and an inertia member 18. The input member 14 comprises an input recess 20 that extends partially along the axial direction of the device 10. Preferably, the input recess 20 is generally square shaped and is designed to be selectively secured to the anvil 22 of an impact wrench 12. However, other polygonal shapes may also be used. The anvil 22 includes a round body with a generally square drive head. The generally square drive head is designed to be received within the input recess 20 for forming a selectively secured arrangement.

The output member 16 includes an output recess 26. As illustrated in FIG. 1, the output recess 26 is a polygonal-shaped output recess 26 for receiving a fastener. The output recess 26 extends partially along the axial direction of the device 10. The fastener may be a bolt, screw, nut, etc. As is well known within the art, at least a portion of the fastener (e.g. the head of a bolt and the body of a screw) has a polygonal-shape that corresponds with the polygonal-shaped output recess 26. During use, the polygonal-shaped portion of the fastener is inserted into the polygonal-shaped output recess 26 for operation and is selectively secured to one another by friction fit. The fastener is preferably hexagonally shaped.

The inertia member 18 is substantially circular and is positioned on the exterior surface of the device 10. Preferably, the inertia member 18 is disposed on the exterior surface of the device 10 nearest the input member 14. However, the inertia member 18 may be disposed on any portion of the exterior surface of the device 10 as desired by the user. The inertia member 18 is preferably positioned so as to not interfere with the engagement of the input member 14 to the anvil 22 and the engagement of the output member 16 to the fastener.

The device 10 is designed to be engaged to an impact wrench 12. As is well known by one of ordinary skill in the art, an impact wrench 12 is designed to receive a standard socket and designed to deliver high torque output with the exertion of a minimal amount of force by the user. The high torque output is accomplished by storing kinetic energy in a rotating mass, and then delivering the energy to an output shaft or anvil 22. Most impact wrenches 12 are driven by compressed air, but other power sources may be used such as electricity, hydraulic power, or battery operation.

In operation, the power is supplied to the motor that accelerates a rotating mass, commonly referred to as the hammer 28. As the hammer 28 rotates, kinetic energy is stored therein. The hammer 28 violently impacts the anvil 22, causing the anvil 22 to spin and create high torque upon impact. In other words, the kinetic energy of the hammer 28 is transferred to rotational energy in the anvil 22. Once the hammer 28 impacts the anvil 22, the hammer 28 of the impact wrench 12 is designed to freely spin again. Generally, the hammer 28 is able to slide and rotate on a shaft within the impact wrench 12. A biasing element, such as a spring, presses against the hammer 28 and forces the hammer 28 towards a downward position. In short, there are many hammer 28 designs, but it is important that the hammer 28 spin freely, impact the anvil 22, and then freely spin again after impact. In some impact wrench 12 designs, the hammer 28 drives the anvil 22 once per revolution. However, there are other impact wrench 12 designs where the hammer 28 drives the anvil 22 twice per revolution. There are many designs of an impact wrench 12 and most any impact wrench 12 may be selectively secured with the device 10 of the present invention.

The output torque of the impact wrench 12 is difficult to measure, since the impact by the hammer 28 on the anvil 22 is a short impact force. In other words, the impact wrench 12 delivers a fixed amount of energy with each impact by the hammer 28, rather than a fixed torque. Therefore, the actual output torque of the impact wrench 12 changes depending upon the operation. The anvil 22 is designed to be selectively secured to a device 10. This engagement or connection of the anvil 22 to the device 10 results in a spring effect when in operation. This spring effect stores energy and releases energy. It is desirable to mitigate the negative consequences of the spring effect because the device 10 utilizes the inertia generated by the inertia member 18 to transmit energy past the connection of the anvil 22 and the device 10. Additionally, there is a spring effect between the device 10 and the fastener. Again, this spring effect stores energy and releases energy. It is again desirable to mitigate the negative consequences of the spring effect because the device 10 utilizes the inertia generated by the inertia member 18 to transmit energy past the connection of the device 10 and fastener.

The purpose of the inertia member 18 is to increase the overall performance of an impact wrench 12, containing a rotary hammer 28, by increasing the net effect of the rotary hammer 28 inside the impact wrench 12. The performance is increased as a result of the inertia member 18 functioning as a type of stationary flywheel on the device 10. Stationary flywheel means the flywheel is stationary relative to the device 10, but moves relative to the anvil 22 and the fastener. By acting as a stationary flywheel, the inertia member 18 increases the amount of torque applied to the fastener for loosening or tightening the fastener.

Figure 8:
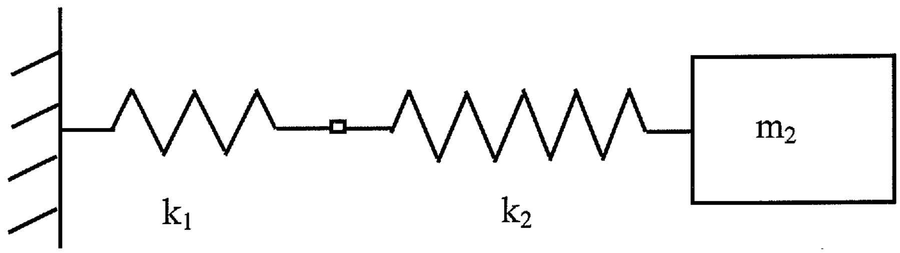
FIG. 8 is a block diagram indicating a standard prior art socket disposed on the anvil of an impact wrench for removing a fastener.

In a prior art application, a standard socket is disposed on the anvil 22 of an impact wrench 12 for removing a fastener, as indicated in FIG. 8. It should be noted that FIG. 8 is shown in a linear system, but the impact wrench 12 and socket is a rotary system. The mass moment of inertia of the impact wrench 12 is designated $m_2$ and represents the mass moment of inertia of the rotary hammer 28 inside the impact wrench. The spring rate of the anvil 22 and socket connection is represented by $k_2$. The spring rate of the socket and fastener connection is represented by $k_1$, and the fastener is represented by ground. As represented in FIG. 8, the combined spring rate of $k_1$ and $k_2$, greatly reduces the peak torque delivered by the impact wrench 12 during impact with the fastener. The combined spring rate of $k_1$ and $k_2$ allows the mass $m_2$ to decelerate more slowly, thereby imparting a reduced torque spike.

Figure 9:
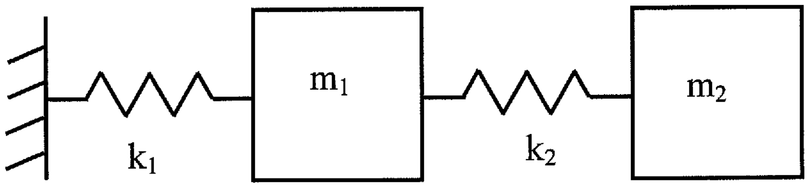
FIG. 9 is block diagram of the present invention indicating an inertia member that adds a substantial mass a large distance from the axis of rotation of the rotary impact device.

In the present application, as illustrated in FIG. 9, the inertia member 18 adds a substantial mass a large distance from the axis of rotation of the rotary impact device 10. Again, it should be noted that FIG. 9 is shown in a linear mode, but the impact wrench and socket is a rotary system. The inertia member 18 of the rotary impact device 10 is represented by $m_1$. The inertia member $m_1$ is situated between spring effects $k_1$ and $k_2$. The spring rate of the anvil and socket connection is represented by $k_2$. The spring rate of the socket and fastener connection is represented by $k_1$, and the fastener is represented by ground. The mass moment of inertia of the impact wrench is designated $m_2$ and represents the mass moment of inertia of the rotary hammer inside the impact wrench. The spring rate of $k_1$ is three times that of $k_1$ and $k_2$ combined, causing very high torques to be transmitted from the inertia member $m_1$ to the fastener.

As is known to one of ordinary skill in the art, the combination of two masses ($m_1$ and $m_2$) and two springs ($k_1$ and $k_2$) is often referred to as a double oscillator mechanical system. In this system, the springs ($k_1$ and $k_2$) are designed to store and transmit potential energy. The masses ($m_1$ and $m_2$) are used to store and transmit kinetic energy. The double oscillator system can be tuned to efficiently and effectively transfer energy from the impact device ($m_2$) through $k_2$, inertia member ($m_1$) and $k_1$ and into the fastener. Proper tuning will ensure most of the energy delivered by the impact wrench $m_2$ is transferred through spring $k_2$ and into the inertia member 18. During use, the rate of deceleration of mass $m_1$ is very high since spring $k_1$ is stiff. Since deceleration is high the torque exerted on the fastener is high.

Figure 5:
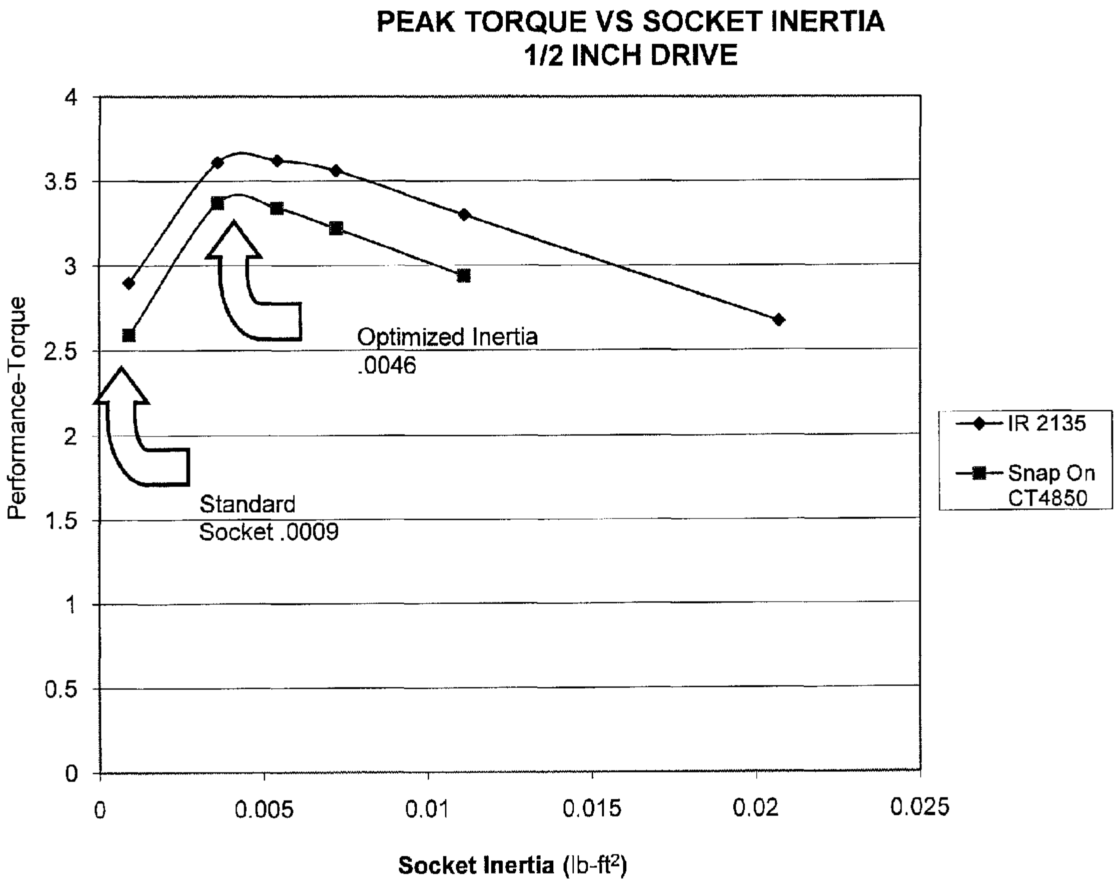
FIG. 5 is a graph charting the torque vs. socket inertia of a prior art socket and the rotary impact device of the present invention to determine the optimized inertia.

The preexisting elements of the double oscillator system are predetermined. The rotary hammer inside the impact wrench $m_2$ and springs $k_1$ and $k_2$ have defined values. For tuning the system, the only value which needs to be determined is the inertia member $m_1$ (18) of the rotary impact device 10 for achieving optimized inertia. The impact wrench, depending upon the drive size (i.e. ½", ¾", 1"), has a different optimal inertia for each drive size. The spring rate $k_2$ and the rotary hammer inside the impact wrench $m_2$ are coincidentally the same for all competitive tools. As illustrated in FIG. 5, the optimal inertia for a ½" drive impact wrench is charted by comparing the performance torque with the socket inertia. A standard socket is charted and the rotary impact device is charted in FIG. 5. As is clearly evidenced in FIG. 5, the rotary impact device 10 of the present invention has a higher torque output than a standard, prior art socket. Additionally, the optimized inertia for a ½" drive impact wrench is 0.0046 lb-ft$^2$ (1.938 kg-cm$^2$).

The inertia member 18 may have any configuration that would increase the torque output of the rotary impact device 10. One exemplary embodiment of the inertia member 18 is illustrated in FIGS. 1 and 2. The inertia member 18 has a front surface 30, a top surface 32, and a back surface 34. In this exemplary embodiment, the inertia member 18 contains three-spaced apart bores 36 that extend substantially longitudinally along the inertia member 18. In other words, the three-spaced apart bores 36 extend along the front surface 30 and back surface 34. The three spaced-apart bores 36 extend through the inertia member 18 from the front surface 30 to the back surface 34. The transition from the front surface 30 of the inertia member 18 contains a chamfer 38 that circumscribes the spaced apart bores 36. Although three-spaced apart bores 36 are illustrated in FIG. 1, any number of spaced apart bores 36 may be utilized, or in the alternative, the inertia member 18 may be a solid piece containing no bores 36.

Additionally, the output member 16 contains a beveled outer edge 40. The beveled outer edge 40 allows for easily inserting the fastener into the output recess 26 of the output member 16. When the output member 16 comes in contact with the fastener for forming a selectively secured arrangement, the beveled outer edge 40 of the output recess 26 aids in guiding the fastener into the output recess 26.

Figure 6:
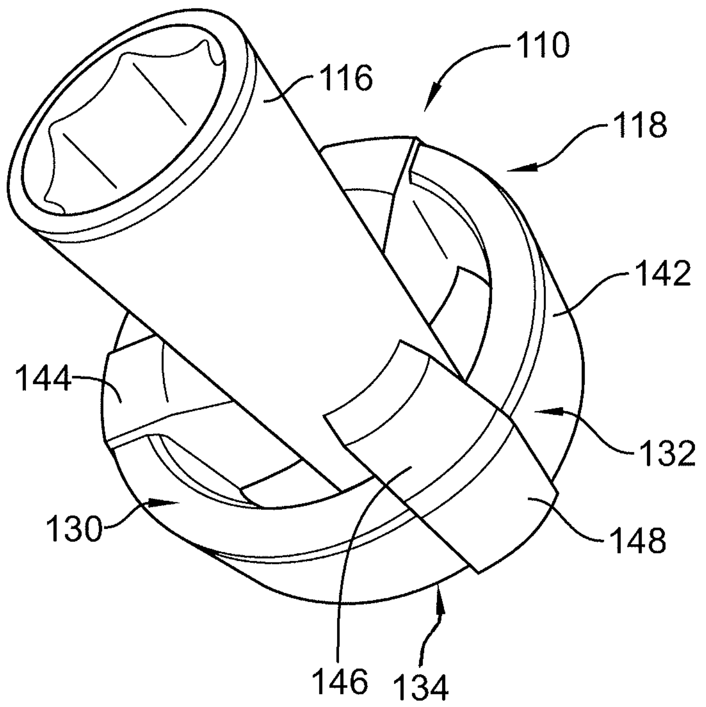
FIG. 6 is a perspective view of another embodiment of the rotary impact device.

Another exemplary embodiment of the rotary impact device is shown in FIG. 6 as is referred to generally as reference number 110 including an output member 116. The inertia member 118 of this exemplary embodiment has a ring 142, which may be solid, containing three (3) ribs 144 for keeping the ring 142 stationary and engaged to the exterior surface of the device 110. The three ribs 144 are engaged to the exterior surface of the device 110 for positioning the ring 142 in a spaced apart relationship with the device 110. The ribs 144 extend radially outward from the exterior surface of the device 110 and include a collar 146 prior to the rib 144 engaging the ring 142. The rib 144 extends slightly beyond the front surface 130, top surface, 132, and back surface 134 of the ring 142 forming a step 148 upon these surfaces (130,132,134) of the ring 140.

Figure 7:
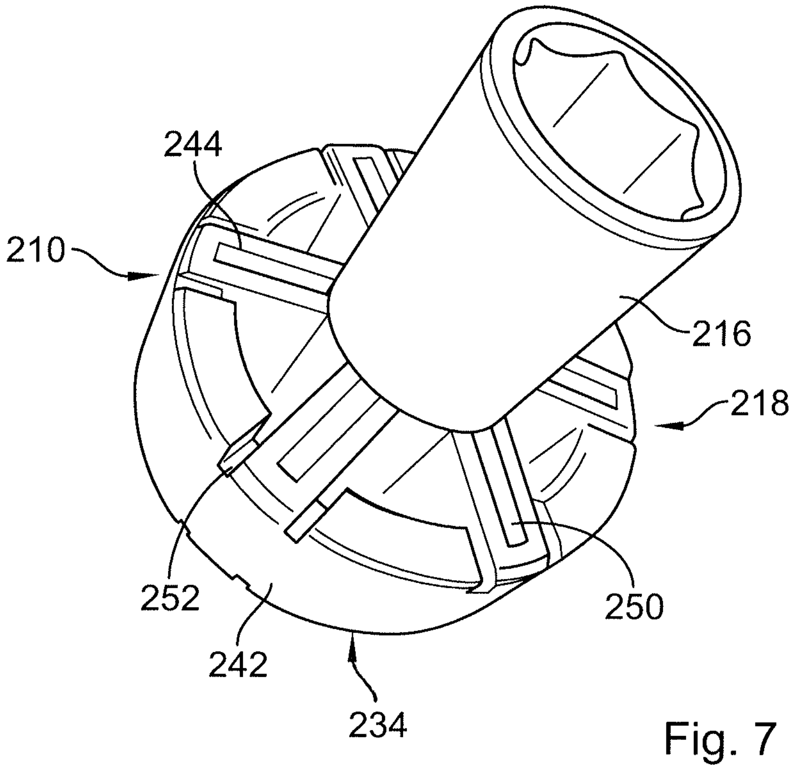
FIG. 7 is a perspective view of another embodiment of the rotary impact device.

Another exemplary embodiment of the rotary impact device is shown in FIG. 7 and is referred to generally as reference number 210 including an output member 216. The inertia member 218 of this exemplary embodiment is a ring 242 containing five (5) ribs 244. The ribs 244 keep the ring 244 stationary and engaged to the exterior surface of the device 210. The five (5) ribs 244 are engaged to the exterior surface of the device 210 for positioning the ring 244 in a spaced apart relationship with the device 210. The ribs 244 extend radially outward from the exterior surface of the device 210 and include an inset 250 within the interior of each rib 244. A shelf 252 is positioned on the front surface 230 of the ring 242 for receiving each rib 244. Likewise, a shelf 252 may be positioned on the back surface 234 of the ring 242 for receiving each rib 244.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An impact tool, comprising:

an impact tool that includes a rotary hammer and an anvil;

wherein the hammer impacts the anvil to rotate the anvil;

wherein the anvil extends outwardly from the hammer;

a socket that secures to the anvil opposite the hammer;

wherein the socket includes a body that extends between a first end and a second end:

wherein the first end includes a first opening having a first inner wall that extends inwardly from the first opening to define a square-shaped input recess that receives the anvil to secure to the anvil opposite the hammer;

wherein the second end includes a second opening and a second inner wall that extends inwardly from the second opening to define a hexagonal-shaped output recess configured to receive a head of a fastener;

wherein the body includes a cylindrical outer surface that defines a first radius;

wherein the body includes a disk positioned between the first end and the second end and a distance closer to the first end than to the second end;

wherein the disk defines a second radius that is greater than the first radius, wherein the disk includes at least two ribs extending outwardly from the cylindrical outer surface;

wherein a ring is secured to an outer radial end of each rib and is spaced apart from cylindrical outer surface;

wherein the disk remains stationary with respect to the body including the first end and the second end and located exterior of the impact tool.

2. The impact tool of claim 1, wherein the body of the socket is formed as a single monolithic steel body.

3. The impact tool of claim 1, wherein the ring has an inner surface that defines a third radius extending from the body, the third radius being greater than the first radius and less than the second radius.

4. An impact tool, comprising:

an impact tool that includes a rotary hammer and an anvil;

wherein the hammer impacts the anvil to rotate the anvil;

wherein the anvil extends outwardly from the hammer of the impact tool;

a socket that secures to the anvil opposite the hammer;

wherein the socket includes a body that extends between a first end and a second end, the body including:

wherein the first end includes a first opening having a first inner wall that extends inwardly from the first opening to define a square-shaped input recess that receives the anvil to secure to the anvil opposite the hammer;

wherein the second end includes a second opening and a second inner wall that extends inwardly from the second opening to define a hexagonal-shaped output recess configured to receive a head of a fastener;

wherein the body includes a cylindrical outer surface that defines a first radius;

wherein the body includes a disk positioned between the first end and the second end;

wherein the disk includes a first ring that extends transversely from the body to a second radius that is greater than the first radius of the outer surface of the body;

wherein the disk includes at least two ribs extending outwardly from the second radius of the first ring to a third radius;

wherein a second ring is secured to an outer radial end of each rib and is spaced apart from first ring.

* * * * *